June 22, 1965 A. V. LOOS 3,190,788
PRESSURE-SENSITIVE ADHESIVE TAPE
Filed Nov. 3, 1958

Inventor
Allen V. Loos
by
Ooms, McDougall, Williams & Hersh
ATTY.

United States Patent Office 3,190,788
Patented June 22, 1965

3,190,788
PRESSURE-SENSITIVE ADHESIVE TAPE
Allen V. Loos, Arlington Heights, Ill., assignor to Mystik Adhesive Products, Inc., Northfield, Ill., a corporation of Illinois
Filed Nov. 3, 1958, Ser. No. 771,389
1 Claim. (Cl. 161—164)

The present invention relates generally to the manufacture of pressure-sensitive adhesive products and more particularly to oriented shrinkable protective covers for pressure-sensitive adhesive products. Throughout this description, such products shall be exemplified by pressure-sensitive adhesive tapes.

A difficult problem long facing the manufacturers of pressure-sensitive adhesive tapes arises from the adhesion developed between the adhesive layer on one span and the backing of an adjacent span about which it is wrapped when the tapes are marketed in conventional roll form (or between adjacent sheets when marketed in the form of stacked sheets). With rolled tapes, for example, it is frequently difficult to unwind a desired length of tape from the roll because the adhesion between the adjacent spans causes portions of the adhesive layer to detach and stick to (or follow) the back surface of the adjacent span. With adhesive on the back surface, the tape is difficult to handle (it sticks to the user), and it attracts dirt. The removal of adhesive from its desired place further causes that portion of the tape roll to possess below normal adhesion properties and, therefore, it is incapable of effecting the bond for which it is designed. The problem similarly exists between adjacent of stacked sheets.

A variety of proposed solutions have been advanced through the years in an attempt to overcome the problem of adhesive transfer, or as it shall be herein called, "offsetting."

One approach to the problem involved experimenting with pressure-sensitive adhesive formulations to find one which did not adhere to adjacent backing surfaces. As this approach was followed, however, it was realized that it provided only one-half of the answer because the backing to which the adhesive material is to adhere in one instance and to clear in the other, was made of the same material. The result: a formulation which did not adhere to the backing of the adjacent span likewise did not adhere to its own backing and an unstable tape was created.

Further work was performed to develop a prime or base coat adhesive which would provide a cohesive force to bond the adhesive layer to its own backing span while permitting the non-adhering relationship between the adhesive and the backing material to be exploited to counteract the offset problem. Thus by coating one surface of the backing with special prime coat and then coating the prime coat with a layer of the non-adherent pressure-sensitive adhesive, a laminated tape structure was achieved which fairly well resisted offsetting.

This approach, however, is not the panacea it was first thought to be. Because of its special formulations, additional processing, including the additional coating and curing procedures, and the lengthened time of fabrication, the laminated type tape is considerably more expensive than its predecessor.

The art next turned to explore the use of liner materials as a possible solution to the problem. When protective liners are used, they are generally formulated of a material which is inert relative to both the adhesive and the backing. The normal practice is to interweave a continuous band of the liner material intermediate adjacent spans of the adhesive tape thereby preventing all contact between the adhesive layer of one span and the backing of the adjacent. Thus after the tape is unwound, the liner material is withdrawn from the adhesive surface and the tape is ready for use, or at least that was the theory. In practice, however, the tapes with protective liners which have been developed are fraught with disadvantages.

A major disadvantage of the known lined tapes is the extreme difficulty accompanying detaching the liner material from the tape. Many fingernails have been broken and much valuable time wasted because the tenacity between the liner material and the adhesive layer of the tape prevents their ready separation. Knives, picks and other sharp objects are frequently needed to remove the liner and even with these tools, time and frequently tape is wasted.

A further major disadvantage is that even after laboriously separating the liner material from the tape, the problem of offsetting is again present. Now the adhesive material, instead of offsetting on the backing, offsets onto the liner. While this does provide a cleaner back to the adjacent span, it does not overcome the problem arising when too little adhesive remains upon the tape. Thus even the lined tapes which are commercially available do not effect proper adhesion when used.

The present invention provides a solution for the offset problem attendant prior art pressure-sensitive adhesive tapes with a tape structure having a readily removable protective liner. More particularly, this invention is directed to the fabrication of an improved pressure-sensitive adhesive tape comprising a dimensionally stable backing coated with a layer of pressure-sensitive adhesive and wound with a protective liner formed of an oriented plastic film characterized by elastic memory whereby the film shrinks when heated to a temperature in excess of its temperature of de-orientation or permitting molecular rearrangement.

Accordingly, one of the prime objects of the present invention is to provide an improved pressure-sensitive adhesive tape having an improved protective liner which prevents the offset of adhesive thereonto while permitting the quick and easy removal thereof.

Another object of the present invention is to provide an improved pressure-sensitive tape in which the synergistic coaction of a dimensionally stable backing and thermally responsive oriented plastic protective liner provides a tape with ease of handling heretofore unrealized in the field of pressure-sensitive adhesive tapes.

Another object of the present invention is to provide a protectively lined pressure-sensitive adhesive tape in which a protective liner is readily separable from an adhesive layer by the simple expedient of momentarily heating the liner to a temperature in excess of its temperature of de-orientation or which will permit molecular re-arrangement.

A still further object of the present invention is to provide an improved pressure-sensitive adhesive tape structure characterized by a protective liner which when momentarily heated to a temperature in excess of about 140° F., shrinks to provide means for grasping said liner whereby the liner material is quickly and easily separated from the layer of adhesive material with which it is associated.

An even further object of the present invention is to provide a protective liner for association with pressure-sensitive adhesive tapes characterized by a molecular orientation and elastic memory which responds to momentarily applied heat in excess of its temperature of de-orientation and shrinks to retract from a complementary adhesive surface with which it resides in surface engagement prior to the application of the heat.

These and other objects, as shall hereinafter appear, are readily fulfilled by the present invention in a manner easily discerned from the following detailed description of illustrative embodiments thereof, particularly when considered in conjunction with the accompanying drawing in which.

Figure 1:
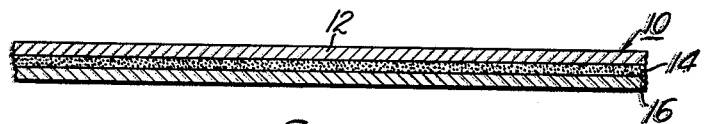
FIG. 1 is a side cross-sectional showing of a pressure-sensitive adhesive tape embodying the present invention having its protective liner attached.

Referring to the drawing, a pressure-sensitive adhesive tape embodying the present invention is generally indicated by reference character 10. Thus in the illustrated embodiment of the present invention, tape 10 comprises a dimensionally stable backing 12 upon which is adherently disposed a layer 14 of a pressure-sensitive adhesive. A protective liner 16 is disposed adjacent layer 14 in planar engagement therewith and may be readily detached therefrom by the application of sufficient theat thereto, exemplified by a conventional match stick 18 burning with a normal flame 20.

In the practice of the present invention, backing 12 is from about 0.5 to about 20 mils thick and may be formed of a number of well known backing materials characterized by a dimensional stability which precludes backing 12 from following liner 16 as it is separated from adhesive layer 14. Among the materials found satisfactory for making backings in the practice of this invention are the metallic foils such, for example, as lead, tin, aluminum, zinc, magnesium, copper, iron, gold and the like; natural and synthetic fabrics such, for example, as cotton, linen, rayon, nylon, asbestos, felt, matted glass, super polyamide and the like; various papers such, for example, as impregnated and coated papers, treated papers such as internally bonded, etherified, and parchmentized paper, rope paper, oriented paper and the like; and the stable plastic films such, for example, as polyethylene, cellulose acetate, polytetrafluoroethylene ("Teflon"), ethylcellulose and the like.

Adhesive layer 14 is formed of a pressure-sensitive adhesive characterized by sufficient cohesion relative to its adhesion with the surfaces upon which it is used to provide relative unity with its backing. Suitable compounds having the desired characteristics include those adhesives containing either natural rubber, synthetic rubber, rubber derivatives, polyisobutylene, ethyl cellulose, nitrocellulose, polymeric resins or the like as cohesive agents; ester gum, hydrogenated rosin, hard cumars, alkyds, pitch, rosin, toluene-sulfonamide-formaldehyde, hydrogenated cumarone-indene resins or other coal tar resins and the like as adhesive agents; methyl abietate, soft alkyds, soft cumars, dibutyl phthalate, diethyl phthalate, chlorinated diphenyl, tricresyl phosphate, wood rosin and its glycol ester, or the like as plasticizers; and which may contain hydrogenated waxes, vegetable and animal waxes, mineral waxes or the like as modifiers.

It is, of course, understood that insofar as the present invention is concerned, any of the above or any other of the well known pressure-sensitive adhesives having the desired characteristics may be incorporated into the present invention with satisfaction. Thus, the so-called silicone pressure-sensitive adhesives may likewise be used in the practice of this invention.

As used herein, silicone pressure-sensitive adhesives refer to those adhesive formulations of organosilicon polymers believed to comprise principally polyorgansiloxanes composed mainly of reoccurring and alternating structural units having the general formula $R_2SiO$, where R may be a methyl radical $(CH_3)$ a phenyl radical $(C_6H_5)$ or a phenyl methyl radical $(C_6H_5—CH_3)$. Commercial pressure-sensitive silicone adhesives such, for example, as those marketed by Dow Corning Corporation, Midland, Mich., under the trade-designations "C–269," "C–271," and "C–274" have been found to give quite satisfactory results when mixed with from 0.1 to about 5 parts by weight (per 100 parts resin) of a catalyst such, for example, as benzoyl peroxide, 2-4 dichlorobenzoyl peroxide, tertiary butyl perbonzoate and the like; a sufficient quantity of a solvent selected from the group consisting of the aromatic hydrocarbons such, for example, as xylene, toluene, heptane and the like, to provide a formulation having a viscosity suitable for the desired manner of coating; and from 10–200 parts by weight (per 100 parts resin) of a filler material such, for example, as alumina, zinc oxide, titanium oxide, calcium carbonate, asbestos, magnesium oxide, silica aerogels, fume silicas, clay, bentonite, and the like.

The processing conditions for applying and drying the adhesive coating should provide minimum tension in the backing. Application of the adhesive formulation may be effected by any of the conventional methods such, for example, as roller coating, spray coating, knife coating, brush coating and the like, consideration being given to the method to be used in creating the viscosity of the adhesive formulation.

The pressure-sensitive adhesive layer may be applied on the backing to provide a coating weight preferably of less than 100 pounds per ream and preferably more than 5 to 10 pounds per ream. If desired, heat may be applied to accelerate the formation of adhesive layer 14 from the formulation by suitable means such, for example, as forced air, infrared heaters, drum-type heaters and the like, although care should be exercised with certain of the adhesive formulations to maintain the temperatures beneath that which might adversely affect certain of the backings and the formulations.

To assist in a more complete understanding of the present invention, the following are examples of pressure-sensitive adhesive formulations which may be employed in the practice of this invention:

*Example 1*

| Constituent: | Parts by weight |
| --- | --- |
| Pale crepe rubber | 80 |
| Butadiene-styrene copolymer (GR–S 1022) | 20 |
| Polybeta pinene (Piccoylte S–115) | 60 |
| Alkylated polyhydroxy phenol | 1 |
| Hydrogenated rosin (Staybellite Ester #10) | 30 |
| Titanium dioxide | 25 |
| Heptane | 645 |

*Example 2*

| Pale crepe rubber | 80 |
| --- | --- |
| Butadiene-styrene copolymer (GR–S 1022) | 20 |
| Polybeta pinene (Piccoylte S–115) | 60 |
| Hydrogenated rosin (Staybellite Ester #10) | 30 |
| Titanium dioxide | 25 |
| Toluol | 650 |

*Example 3*

| Pale crepe rubber | 70 |
| --- | --- |
| Butadiene-styrene copolymer (GR–S 1022) | 30 |
| Polybeta pinene (Piccoylte S–115) | 40 |
| Hydrogenated rosin (Staybellite Ester #10) | 15 |
| Alkylated polyhydroxy phenol | 1 |
| Heptane | 650 |

*Example 4*

| Pale crepe rubber | 80 |
| --- | --- |
| Butadiene-styrene copolymer (GR–S 1022) | 20 |
| Polybeta pinene (Piccoylte S–115) | 60 |
| Hydrogenated rosin (Staybellite Ester #10) | 10 |
| Pigment | 10 |
| Benzol | 650 |

Example 5

| Constituent: | Parts by weight |
|---|---|
| Smoked rubber sheet | 20 |
| Cumarone-indene resin | 4 |
| Zinc oxide | 1 |
| Benzol | 225 |

Example 6

| | |
|---|---|
| GR–S 16 butadiene styrene polymer | 12 |
| Hydrogenated rosin (Staybellite Ester #10) | 8 |
| Heptane | 80 |

Example 7

| | |
|---|---|
| Smoked rubber sheet | 10 |
| Zinc oxide | 8 |
| Naphthenic mineral oil | 4 |
| Benzol | 66 |

Example 8

| | |
|---|---|
| Silicone resin (Dow) | 100 |
| Titanium dioxide | 10 |
| Hydrated alumina | 5 |
| Benzoyl peroxide | 3 |
| Toluol | 75 |

Example 9

| | |
|---|---|
| Silicone resin (Dow) | 100 |
| Titanium dioxide | 20 |
| Hydrated alumina | 5 |
| 2–4 dichlorobenzoyl peroxide | 2 |
| Toloul | 70 |

Example 10

| | |
|---|---|
| Silicone resin (Dow) | 100 |
| Zinc oxide | 25 |
| Tertiary butyl perbenzoate | 5 |
| Benzol | 90 |

Example 11

| | |
|---|---|
| Silicone resin (Dow) | 100 |
| Calcium carbonate | 5 |
| Hydrated alumina | 5 |
| Benzoyl peroxide | 1 |
| Toluol | 72 |

Example 12

| | |
|---|---|
| Silicone resin (Dow) | 100 |
| Magnesium oxide | 12 |
| Asbestos | 5 |
| 2–4 dichlorobenzoyl peroxide | 3 |
| Heptane | 81 |

Example 13

| | |
|---|---|
| Silicone resin (Dow) | 100 |
| Zinc oxide | 5 |
| Titanium dioxide | 10 |
| Benzoyl peroxide | 0.5 |
| Toluol | 70 |

Protective liner 16 comprises an oriented film of about 0.5 to about 4 mils thick which shrinks longitudinally when it is heated to a temperature above its temperature of de-orientation. In the practice of the present invention, oriented unplasticized polyvinyl chloride, polyethylene, polypropylene, and the polyesters such as "Mylar" (the ester of terephthalic acid and ethylene glycol) are found to provide excellent results.

More particularly, protective liner 16 is characterized by shrinking upon heating to a temperature about its temperature of de-orientation or molecular rearrangement whereupon the liner pulls away from the layer of pressure-sensitive adhesive to enable its easy removal. The thermal retraction of liner 16 coupled with the dimensional stability of backing 12 as previously described, provides a tape which will not follow the liner so that easy separation can be effected. While certain liner materials are above specified, other of the known film-forming plastic materials which are capable of molecular orientation and which embody elastic memory are the full equivalents of the described liner materials and may be substituted therefor without departing from the present invention.

Particularly useful in this invention because of their commercial availability are oriented unplasticized polyvinyl chloride (de-orientation temperature above about 140° F.), oriented polyethylene (de-orientation temperature above about 175° F.), polyvinylidene chloride (de-orientation temperature above about 175° F.), and polyesters (Mylar-de-orientation temperature above about 300° F.).

In one embodiment of the present invention, a backing sheet of lead foil is coated with a pressure-sensitive adhesive formulation and set, as previously described. Upon the adhesive surface, a protective liner of oriented (in at least one direction) unplasticized polyvinyl chloride is engaged. The sheet can then be rolled or stacked and is ready for the trade.

Figure 2:
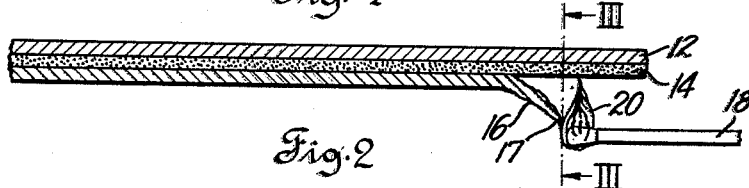
FIG. 2 is a side cross-sectional showing of the tape of FIG. 1 with heating means juxtaposed thereto in operative relationship therewith.
Figure 4:
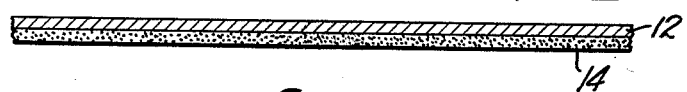
FIG. 4 is a cross-sectional showing of a pressure-sensitive adhesive tape of the present invention from which the protective liner has been completely detached.
Figure 3:
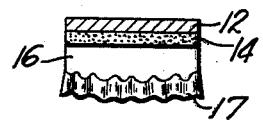
FIG. 3 is a cross-sectional showing of the pressure-sensitive adhesive tape of FIG. 2 taken along line III—III thereof.

When the sheet is ready for use, the protective liner 16 is quickly and easily removed by applying heat to one edge thereof as by a hot plate, a match, a Bunsen burner, a burning cigarette and the like (illustrated by a match 18 and flame 20 in FIG. 2.) Upon application of heat in excess of the temperature of plastic flow of the liner material, the oriented film 16 shrinks and retracts from the adhesive layer 14, as shown in FIG. 2, to provide a retracted edge 17. As particularly shown in FIG. 3, edge 17 may thus easily be grasped and the final separation of liner 16 and adhesive layer 14, readily effected to put the tape in condition for use as shown in FIG. 4. As shown in FIG. 4, there is no known instance where adhesive offsetting occurs with pressure-sensitive tapes embodying the present invention.

In another embodiment of the present invention, a backing of aluminum foil is coated with a silicone adhesive and cured in the well known manner. Upon the cured silicone adhesive, a layer of oriented Mylar is laid. The tape is then rolled and is ready for the trade.

It is of course understood that the principal concept of the present invention while described in connection with the fabrication of pressure-sensitive adhesive tapes is not limited thereto. For example, it is contemplated that oriented shrinkable protective liners will be most useful with pressure-sensitive adhesive sheetings such as are gaining great favor for adding decor to both office and home, and with other products utilizing pressure-sensitive adhesives in a manner where offsetting and consequently liner removal presents problems. And while certain exemplary embodiments have been herein described and illustrated, they are presented to define, not to limit, the present invention and such applications and modifications of the procedures and formulations herein described as may be readily apparent to those skilled in the art are within the spirit of the present invention, especially as it is defined by the appended claim.

What is claimed is:

An article of manufacture comprising a backing having a longitudinal axis extending therewith 0.5 mil to 20 mils thick selected from the group consisting of aluminum and lead foil, and having first and second planar surfaces, a layer of pressure-sensitive adhesive adherently disposed upon said backing and covering one of said surfaces, and a film 0.5 to 4 mils thick of oriented unplasticized polyvinyl chloride disposed upon said layer in surface engagement therewith, with the orientation of the unplasticized polyvinyl chloride being substantially coaxial with said longitudinal axis of said backing and said orientation being sufficient to permit shrinking of said film upon heating to a temperature greater than its deorientation temperature whereby said film breaks its surface engagement with said layer.

(References on following page)

References Cited by the Examiner

UNITED STATES PATENTS

| | | | |
|---|---|---|---|
| 2,622,656 | 12/52 | Pinsky | 154—2.6 |
| 2,667,436 | 1/54 | Goepfert et al. | |
| 2,784,457 | 3/57 | Grabenstein. | |
| 2,804,416 | 8/57 | Phillipsen | 154—53.5 |
| 2,821,155 | 1/58 | Seckel. | |
| 2,822,290 | 2/58 | Weber | 154—53.5 X |
| 2,966,439 | 12/60 | Sorel | 154—139 |

OTHER REFERENCES

Modern Plastics Encyclopedia for 1959—September 1958, pages 444–450, and 768–773.

"Nature"—Crossed Amorphous and Crystalline Chain Orientation in Polyethylene Film, June 20, 1957, pages 1104–1106.

EARL M. BERGERT, *Primary Examiner.*

A. WYMAN, C. F. KRAFFT, R. LEIBOWITZ,
*Examiners.*